Patented June 27, 1950

2,512,950

UNITED STATES PATENT OFFICE 2,512,950

PROCESS FOR THE PRODUCTION OF POLYOXYMETHYLENE ETHERS

Thomas Edward Londergan, Niagara Falls, N. Y., assignor to E. I. du Pont de Nemours & Company, Wilmington, Del., a corporation of Delaware No Drawing. Application December 30, 1944, Serial No. 570,763

8 Claims. (Cl. 260—615)

1

This invention relates to the production of polyoxymethylene ethers, and more particularly, it relates to a new and improved process for the production of polyoxymethylene ethers from formaldehyde and an aliphatic hydroxy compound in the presence of concentrated sulfuric acid.

It has been known, heretofore, to react formaldehyde, as well as paraformaldehyde, with aliphatic hydroxy compounds in the presence of concentrated sulfuric acid for the production of polyoxymethylene ethers. Such previously known processes were, however, limited to the production of such ethers in comparatively low yields. Prior, to this invention, the above reaction was carried out either by reacting the aliphatic hydroxy compound, for example methanol, with an aqueous solution of formaldehyde such as commercial aqueous formaldehyde, or the hydroxy compound was reacted with solid paraformaldehyde. As a result, yields of the ether above about 40% of theoretical could not be readily obtained.

It is an object of this invention to provide a new and improved process for the production of a polyoxymethylene ether from formaldehyde or formaldehyde polymers and an aliphatic hydroxy compound whereby greatly increased yields of the ether may be readily obtained.

It is another object of this invention to provide a new and improved process for the production of polyoxymethylene dimethyl ether from a formaldehyde polymer of the polyoxymethylene type and methanol.

Other objects of the invention will appear hereinafter.

The above objects may be accomplished, in general, by forming a substantially non-aqueous solution (i. e. a solution containing less than 5% water based on the total weight of the solution) comprising 60 to 90 parts by weight of a compound taken from the group consisting of formaldehyde and formaldehyde polymers of the polyoxymethylene type dissolved in 40 to 10 parts by weight of an aliphatic hydroxy compound containing 1 to 3 hydroxy radicals and being free from any other functional group, and adding to said solution, as a catalyst, concentrated sulphuric acid (over 70% H$_2$SO$_4$). The crude polymer thus obtained is then treated with an aqueous alkali or alkaline salt to neutralize acid and dissolve formaldehyde or formaldehyde polymers other than the desired polyoxymethylene ethers which are then removed by filtration, washed and dried.

As distinguished from prior art methods, it has

2 been found in accordance with this invention, that if the formaldehyde or the formaldehyde polymer is dissolved in the aliphatic hydroxy compound to the extent of 60 parts to 90 parts, by weight in the form of a non-aqueous solution, greatly increased yields of the ether will be obtained. When paraformaldehyde is used as the formaldehyde polymer it may be necessary to add a substance which will bring about dissolution of the paraformaldehyde in the hydroxy compound. For example, when it is desired to dissolve paraformaldehyde in methanol or other aliphatic hydroxy compound, an alkaline material such as sodium alcoholate or an alcoholic sodium or potassium hydroxide is added to the hydroxy compound. When trioxane is used as the formaldehyde polymer, the use of a material to bring about solution is not necessary since trioxane is readily soluble in aliphatic hydroxy compounds.

The following examples are given to illustrate, in detail, certain preferred methods for carrying out the process of the present invention. It is to be understood, of course, that the invention is not limited to the specific details given in the examples:

Example I

A mixture of 117 g. paraformaldehyde and 50 g. methanol were placed in a flask equipped with an agitator and reflux condenser. This mixture was then heated to 70°-80° C. and a saturated solution of 0.1 g. caustic soda in methanol was added. Substantially all of the paraformaldehyde dissolved in approximately 15 minutes after which, 24 cc. (44 g.) of concentrated sulfuric acid (95-96%) was added gradually at such a rate that the temperature did not exceed 80° C. The reaction mixture was then allowed to stand at room temperature for 16 hours. The solidified reaction mixture was then broken up and added to 350 cc. of 15% caustic soda and agitated to form a slurry. After this, it was heated with agitation at 60° C. for 3 hours, filtered, washed with water until the filtrate became neutral, and air dried. The yield consisted of 86.4 g. gamma-polyoxymethylene or 78% theory on a formaldehyde basis. This product melted at 145°-150° C.

Example II

A charge of 70 lbs. paraformaldehyde and 30 lbs. methanol was placed in a stainless steel Read kneading machine equipped with a reflux condenser. To this mixture, one half pound of a 10% solution of sodium methylate in methanol was added. The kneader was then closed and heated with agitation to approximately 70° C. At this point, an additional 3.5 lbs. of the 10% sodium methylate was added. As soon as a clear solution was obtained, 30 lbs. of 95% sulfuric acid was added gradually in small portions at such a rate that the vapor did not exceed 70° C. Two pounds of methanol were then added to wash out the addition tube. After this, the reaction mixture was cooled to room temperature and allowed to agitate for 12 hours. At the end of this period, 75 lbs. of 50% caustic soda were added gradually with cooling, keeping the vapor temperature at or below 60° C. The mixture was then heated at this temperature with agitation for 3 hours. After this, the addition tube was washed out with 5 lbs. water. The slurry was then removed from the kneading machine and filtered, washing the product on the filter with tap water until the filtrate was neutral to phenolphthalein. The wet filter cake was finally dried in stainless steel trays at 40° C. using an air dryer. This product melted at 145–165° C. and contained 0.05% of paraformaldehyde. Percent paraformaldehyde was determined by the sodium sulfite procedure for formaldehyde analysis. Polyoxymethylene ethers give negative results when submitted to this method of analysis.

Example III

A solution comprising 100 g. trioxane and 16 g. methanol heated to a temperature of 60° C. was treated with 16.7 g. of concentrated sulfuric acid which was added gradually. The temperature rose to 100° C. during acid addition. The mixture was then allowed to cool and treated with an excess of a 20% aqueous solution of caustic soda. The product was then filtered, washed with water and dried. The yield of product was approximately 75 g. A similar procedure involving 25 g. trioxane, 2 cc. of methanol and 4 cc. 75% sulfuric acid gave a yield of 19 g. gamma-polyoxymethylene which melted at 164°–170° C.

Example IV

A 50 g. charge of trioxane was mixed with 6 g. of n-butanol and heated to 60° C. To the resultant solution, 4 cc. of concentrated (96%) sulfuric acid was added gradually. The mixture was then allowed to cool to room temperature, broken up in an excess of 20% aqueous sodium hydroxide, washed and dried. Similar experiments were then carried out in which the butanol was replaced by 6 g. of ethylene glycol and glycerol respectively. The yields and melting points of the polyoxymethylene ethers obtained are shown below:

| Hydroxy Compound Used as Raw Material | Yield of Polyoxymethylene Ether, Percent of Theory | Melting Point of Polyoxymethylene Ether |
|---|---|---|
| | | °C. |
| Butanol | 80 | 168–172 |
| Ethylene Glycol | 56 | 166–168 |
| Glycerol | 33 | 156–160 |

The preparation of polyoxymethylene ethers in accordance with the present invention is carried out by the addition of sulfuric acid to a solution containing 6 to 9 parts of formaldehyde or formaldehyde polymer and 4 to 1 parts respectively of aliphatic hydroxy compound. The solution containing the formaldehyde or formaldehyde polymer and the hydroxy compound should be substantially free of water, i. e., the solution should not contain more than 5% water. The invention is limited to solutions and does not apply to slurries or mixtures of formaldehyde polymers and hydroxy compounds. The solution may be slightly cloudy but should not contain any appreciable quantity of suspended matter.

Sulfuric acid ranging in concentration from 70% to 95% or above appears to be the only satisfactory catalyst for this reaction. The quantity of this acid employed should be equivalent to 12% to 60% of the weight of formaldehyde or formaldehyde polymer. In the case of paraformaldehyde or formaldehyde, the preferred amount of acid ranges from 33% to 43% of the weight of polymer. In the case of trioxane, it ranges from 12% to 33%. When paraformaldehyde or formaldehyde is employed, the reaction mixture is preferably allowed to stand for 10 to 24 hours after adding the acid before working up the product. This allows the reaction to proceed to the point where a good yield of polyoxymethylene ethers may be obtained. When trioxane is employed this standing period may be reduced to a few minutes.

Sulfur trioxide and the solutions of sulfur trioxide in sulfuric acid known as oleum act as equivalents of sulfuric acid in this invention. However, with these catalysts, charring will take place unless great care is taken to add them gradually to the reaction mixture.

Phosphoric acid and phosphorus pentoxide give poor yields of polyoxymethylene ethers. Hydrochloric acid and other hydrohalogen acids react with formaldehyde to give haloethers such as dichloromethyl ether and are accordingly unsatisfactory. Nitric acid oxidizes formaldehyde, and organic acids are too weak to catalyze ether formation. Acidic catalysts such as zinc chloride were also found unsatisfactory. Sulfonic acids such as benzene sulfonic acid would not be satisfactory since these acids would give condensation products with formaldehyde.

Equivalents of paraformaldehyde and trioxane as the formaldehyde substance in this preparation include monomeric formaldehyde, tetraoxymethylene, and alpha-polyoxymethylene. In general, any formaldehyde polymer whose structure is that of a polyoxymethylene glycol having the type formula, $HO.CH_2.O.(CH_2O)_n.CH_2OH$, or a cyclic polyoxymethylene, $(CH_2O)_n$, is satisfactory. In this specification and in the appended claims, the term "formaldehyde polymer of the polyoxymethylene type" is employed to denote compounds having the above type formulas. Polyoxymethylene derivatives such as the polyoxymethylene esters, e. g.

$CH_3COO.CH_2.O.(CH_2O)_n.CH_2.OOCCH_3$, or the polyoxymethylene ethers, e. g., $C_2H_5O.CH_2.O.(CH_2O)_n.CH_2.OC_2H_5$, are excluded.

Aliphatic hydroxy compounds which are included must be capable of forming solutions of the composition claimed with polyoxymethylene glycols or cyclic polyoxymethylenes. These include methanol, ethanol, propanol, butanol, etc., glycols, glycerol but not pentaerythritol or compounds containing more than 3 hydroxy groups. In general, trioxane is more compatible with many of these compounds than paraformaldehyde. Some of the higher fatty alcohols will give solutions of the composition claimed with trioxane but will not do so with paraformaldehyde. Those hydroxy compounds which will give solutions of the composition claimed, i. e., containing 60 to 90 parts formaldehyde or formaldehyde polymer and 40 to 10 parts respectively of hydroxy compound are operative for use in accordance with the present invention. In the case of polyoxymethylene glycol types of formaldehyde polymers, solution is obtained through depolymerization and solvation which is brought about by heat, alkaline catalysts or heat plus alkaline catalysis.

The chief advantage of this invention is that it makes it possible to prepare polyoxymethylene ethers in higher yields than can be obtained by any procedure previously described in the chemical literature.

Polyoxymethylene ethers are substantially odorless products of low volatility which gradually liberate small quantities of formaldehyde. Although completely odorless when stored in the open, they will gradually evolve enough formaldehyde to give a distinct odor when stored in a closed space. In the presence of an acid catalyst, they liberate formaldehyde rapidly at a rate controllable by variations in the concentration of catalyst. Polyoxymethylene ethers may, therefore, be used as curing agents for natural and synthetic agents. These ethers also have value as a disinfectant and preservative. They will be of use wherever a controllable source of anhydrous formaldehyde is desired.

Throughout the description and claims, parts and percentages given refer to parts and percentages by weight unless otherwise specified.

Since it is obvious that many changes and modifications can be made in the above-described details without departing from the nature and spirit of the invention, it is to be understood that the invention is not limited by said details except as set forth in the appended claims.

I claim:

1. The process for the production of polyoxymethylene ethers which comprises forming a substantially non-aqueous solution comprising 60 to 90 parts by weight of a compound taken from the group consisting of formaldehyde and formaldehyde polymers of the polyoxymethylene type dissolved in 40 to 10 parts by weight of a saturated aliphatic alcohol containing 1 to 3 hydroxy radicals, and adding to said solution, as a catalyst, concentrated sulfuric acid.

2. The process for the production of polyoxymethylene ethers which comprises forming a substantially non-aqueous solution comprising 60 to 90 parts by weight of a compound taken from the group consisting of formaldehyde and formaldehyde polymers of the polyoxymethylene type dissolved in 40 to 10 parts by weight of a saturated aliphatic alcohol containing 1 to 3 hydroxy radicals, and adding to said solution, as a catalyst, a substance taken from the group consisting of concentrated sulfuric acid, sulfur trioxide, and solutions of sulfur trioxide in sulfuric acid.

3. The process for the production of polyoxymethylene ethers which comprises forming a substantially non-aqueous solution comprising 60 to 90 parts by weight of a compound taken from the group consisting of formaldehyde and formaldehyde polymers of the polyoxymethylene type dissolved in 40 to 10 parts by weight of a saturated aliphatic alcohol containing 1 to 3 hydroxy radicals, and adding to said solution, as a catalyst, from 12% to 60% by weight (based on the weight of the formaldehyde compound) of concentrated sulfuric acid.

4. The process for the production of polyoxymethylene ethers which comprises forming a substantially non-aqueous solution comprising 60 to 90 parts by weight of formaldehyde dissolved in 40 to 10 parts by weight of a saturated aliphatic alcohol containing 1 to 3 hydroxy radicals, and adding to said solution, as a catalyst, from 33% to 43% by weight (based on the weight of the formaldehyde) of concentrated sulfuric acid.

5. The process for the production of polyoxymethylene ethers which comprises forming a substantially non-aqueous solution comprising 60 to 90 parts by weight of formaldehyde in the form of paraformaldehyde dissolved in 40 to 10 parts by weight of a saturated aliphatic alcohol containing 1 to 3 hydroxy radicals, and adding to said solution, as a catalyst, from 33% to 43% by weight (based on the weight of the paraformaldehyde) of concentrated sulfuric acid.

6. The process for the production of polyoxymethylene ethers which comprises forming a substantially non-aqueous solution comprising 60 to 90 parts by weight of formaldehyde in the form of trioxane dissolved in 40 to 10 parts by weight of a saturated aliphatic alcohol containing 1 to 3 hydroxy radicals, and adding to said solution, as a catalyst, from 12% to 33%, by weight (based on the weight of the trioxane) of concentrated sulfuric acid.

7. The process for the production of a polyoxymethylene dimethyl ether which comprises forming a substantially non-aqueous solution comprising 60 to 90 parts by weight of a compound taken from the group consisting of formaldehyde and formaldehyde polymers of the polyoxymethylene type dissolved in 40 to 10 parts by weight of methanol, and adding to said solution, as a catalyst, from 12% to 60% by weight (based on the weight of the formaldehyde compound) of concentrated sulfuric acid.

8. The process for the production of a polyoxymethylene dimethyl ether which comprises forming a substantially non-aqueous solution comprising 60 to 90 parts by weight of formaldehyde in the form of paraformaldehyde dissolved in 40 to 10 parts by weight of methanol, and adding to said solution, as a catalyst, from 33% to 43% by weight (based on the weight of the paraformaldehyde) of concentrated sulfuric acid.

THOMAS EDWARD LONDERGAN.

REFERENCES CITED

The following references are of record in the file of this patent:

UNITED STATES PATENTS

| Number | Name | Date |
|---|---|---|
| 2,183,317 | Auden | Dec. 12, 1939 |
| 2,233,428 | O'Brien | Mar. 4, 1941 |
| 2,304,431 | Walker | Dec. 8, 1942 |
| 2,307,937 | Marvel | Jan. 12, 1943 |
| 2,331,367 | Baggett | Oct. 12, 1943 |
| 2,333,927 | Harvey | Nov. 9, 1943 |
| 2,350,350 | Gresham | June 6, 1944 |
| 2,449,469 | Gresham | Sept. 14, 1948 |

OTHER REFERENCES

Staudinger et al., "Annalen der Chemie," vol. 474, pages 205–216 and 230.

Walker, "Formaldehyde," Reinhold, N. Y., 1944, pages 86–89.